US006416096B1

(12) United States Patent
Stefanik et al.

(10) Patent No.: US 6,416,096 B1
(45) Date of Patent: Jul. 9, 2002

(54) LIFTING HANDLE FOR PLUG-IN IOTS

(75) Inventors: Fred M. Stefanik, Feeding Hills; Alvin B. See, Westfield, both of MA (US)

(73) Assignee: Thomcast Communications, Inc., Southwick, MA (US)

(*) Notice: Subject to any disclaimer, the term of this patent is extended or adjusted under 35 U.S.C. 154(b) by 0 days.

(21) Appl. No.: 09/657,126

(22) Filed: Sep. 7, 2000

Related U.S. Application Data

(60) Provisional application No. 60/196,924, filed on Apr. 13, 2000.

(51) Int. Cl.[7] .......................... B25J 15/00; H01R 43/22

(52) U.S. Cl. .......................... 294/16; 294/31.2; 29/758

(58) Field of Search .......................... 294/15, 16, 27.1, 294/28, 31.2, 68.26, 68.27, 119.2; 29/270, 278, 729, 758, 764

(56) References Cited

U.S. PATENT DOCUMENTS 877,012 A * 1/1908 Sullivan ...................... 294/16
2,384,307 A * 9/1945 Husson et al. ........ 294/119.2 X
2,740,655 A * 4/1956 Maly ......................... 294/31.2
2,832,630 A * 4/1958 Sterling ................. 294/31.2 X
2,999,714 A * 9/1961 Ritchie ...................... 294/31.2
3,052,441 A * 9/1962 Fleischman .......... 294/119.2 X
3,964,126 A * 6/1976 Madsen ..................... 294/31.2
4,723,800 A * 2/1988 Sanders ............... 294/119.2 X

* cited by examiner

*Primary Examiner*—Johnny D. Cherry
(74) *Attorney, Agent, or Firm*—Rothwell, Figg, Ernst & Manbeck

(57) ABSTRACT

A lifting handle temporarily attaches to the water jacket of a plug-in liquid cooled IOT to facilitate installation, replacement, or removal of the IOT. The lifting handle includes two gripping surfaces that conform to the surface of the water jacket of a plug-in liquid cooled IOT. The gripping surfaces are hinged at their rear ends and clamped with a toggle clamp at the front ends. The gripping surfaces may be shaped to provide convenient handling during installation, replacement, or removal.

6 Claims, 1 Drawing Sheet

LIFTING HANDLE FOR PLUG-IN IOTS

CROSS REFERENCE TO RELATED APPLICATION

This application claims priority from provisional application Ser. No. 60/196,924, filed Apr. 13, 2000.

BACKGROUND OF THE INVENTION

Background And Related Art

The present invention relates generally to the installation or replacement of plug-in liquid cooled inductive output tube (IOT) amplifiers, and particularly to an improved handle for use while installing or replacing the same.

Much of the energy of the electron beam in an IOT is converted to thermal energy, which heats the components of the IOT. More specifically, the collector is heated by the thermal energy from the electron beam. Thus, the IOT, and the collector in particular, must be capable of withstanding very high operating temperatures. Accordingly, it is desirable to cool the IOT collector to improve performance.

It is generally known to cool an IOT by circulating a liquid in a water jacket to remove the thermal energy from the IOT. The liquid in plug-in liquid cooled IOTs is generally a water-based fluid. Water-based fluids, however, are inherently incompatible with high-powered electrical applications. If the liquid cooling circuit is mishandled during installation or replacement the water-based fluid may leak and damage the delicate electronic circuitry of the plug-in liquid cooled IOT.

Plug-in liquid cooled IOTs are relatively expensive to produce, fragile, and difficult to maintain. Plug-in liquid cooled IOTs require periodic maintenance to maintain correct operation. Plug-in liquid cooled IOTs require careful handling during installation and maintenance to protect the cooling circuit and electrical connectors from being damaged.

Plug-in liquid cooled IOTs are installed by plugging them into sockets. A plug-in liquid cooled IOT that is misaligned with its socket is liable to be damaged if it is consequently forced into the socket. There are electrical contacts in the form of concentric rings on the plug-in liquid cooled IOT that mate with spring-finger contacts in the socket. The concentric rings must be correctly aligned with their corresponding spring-finger contacts for the plug-in liquid cooled IOT to function properly. These electrical contacts carry signals to the anode, cathode, grid, and other components of the plug-in liquid cooled IOT. Bent, damaged, or misaligned electrical contacts will impede or destroy the RF amplification properties of the plug-in liquid cooled IOT.

The socket may also have rubber gaskets to seal around the coolant passages communicating with the water jacket of the plug-in liquid cooled IOT. Mis-alignment of a plug-in liquid cooled IOT during installation can pinch or displace one of these gaskets, resulting in leaks.

Since the electrical contacts and cooling circuit gaskets of a plug-in liquid cooled IOT are easily damaged, the installer must be able to maintain a secure grip on the plug-in liquid cooled IOT in order to gently insert it into its socket. The installer must also be able to keep the concentric rings of the plug-in liquid cooled IOT straight, aligned, and centered with the spring-finger connectors in the socket during installation. And the installer must be able to align the cooling circuit passages of the plug-in liquid cooled IOT with the gasketed cooling circuit passages of the socket during installation.

Thus, there exists a need for a mechanism to facilitate the correct installation, replacement or removal of plug-in liquid cooled IOTs by giving a technician a convenient way to grip, control, and manipulate them.

SUMMARY OF THE INVENTION

Accordingly, the present invention provides a solution to the problems discussed above.

In particular, the present invention provides a lifting handle that temporarily attaches to the water jacket of a plug-in liquid cooled IOT to facilitate installation, replacement, or removal of the IOT. The lifting handle includes two gripping surfaces that wrap around the water jacket of a plug-in liquid cooled IOT. The gripping surfaces are hinged at their top ends and clamped with a toggle clamp at their bottom ends. The gripping surfaces may be shaped to provide convenient handling during installation, replacement, or removal.

BRIEF DESCRIPTION OF THE DRAWINGS

The invention will be described in detail with reference to the following drawings in which.

DETAILED DESCRIPTION OF THE PREFERRED EMBODIMENTS

Figure 1:
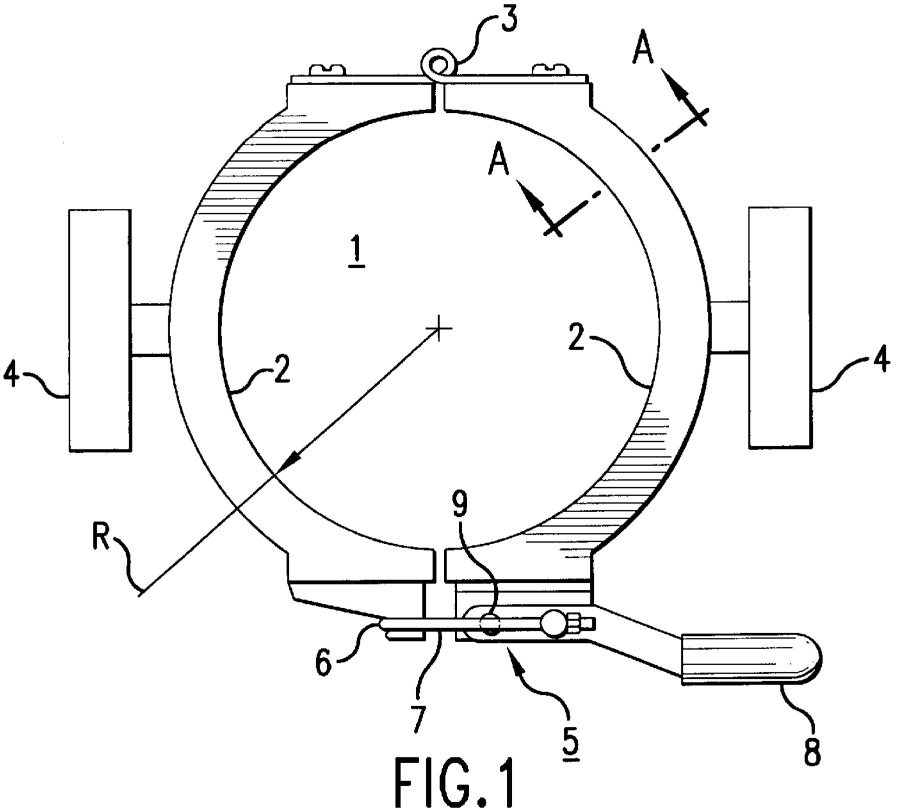
FIG. 1 is a top view of the lifting handle of the present invention.

A lifting handle 1 according to one embodiment of the present invention is shown in FIG. 1. Grips 2 wrap around the water jacket of a plug-in liquid cooled IOT (not shown). Radius R of the semi-circular inner surfaces of grips 2 is sized to conform to the external surface of the water jacket. The rear ends of each of grips 2 are connected with a heavy duty hinge 3. Hinge 3 allows grips 2 to be separated so that the water jacket can be clamped between them. At the sides of each of grips 2 may be knobs 4. Knobs 4 are means by which the lifting handle 1 and the plug-in liquid cooled IOT can be carried, moved, and manipulated. Knobs 4 can be made to be suitable for human hands, mechanical lifting aids such as crane hooks, mechanized devices such as robots, or the like. Knobs 4 can be replaced by handles.

At the front ends of grips 2 is a clamp 5 for releasably clamping grips 2 around the water jacket that includes hook 6, loop 7, lever 8, and pivot 9. Loop 7 is sized to elastically deform grips 2 when a plug-in liquid cooled IOT is held between grips 2 if loop 7 is looped around hook 6 and lever 8 attached to loop 7 is pivoted around pivot 9. Clamp 5 is designed so the elastic deformation of grips 2 is greatest when the lever 8 is at the approximate mid-point of its range of motion. Lever 8 is thus locked at one extreme of its range of motion and released at the other. Clamp 5 is preferably a toggle clamp, but other means of releasably clamping grips 2 around the water jacket can be used. A link and pin, a ratchet, or a screw clamp, for example, could be used instead of a toggle clamp.

The lifting handle is attached to a plug-in liquid cooled IOT by releasing loop 7 of clamp 5 from hook 6 and separating grips 2. Grips 2 must be separated at least as wide as the external diameter of the water jacket. Grips 2 are slipped over the water jacket so the semi-circular inner surfaces of grips 2 conform to the external surface of the water jacket. Loop 7 of clamp 5 is then looped around hook 6 and lever 8 of clamp 5 is pivoted around pivot 9 so as to elastically deform the grips 2 and thus clamp the water jacket between them. The plug-in liquid cooled IOT (not shown) can then be un-plugged, lifted, moved, or plugged in as necessary by manipulating the grips 2 or knobs 4.

Figure 2:
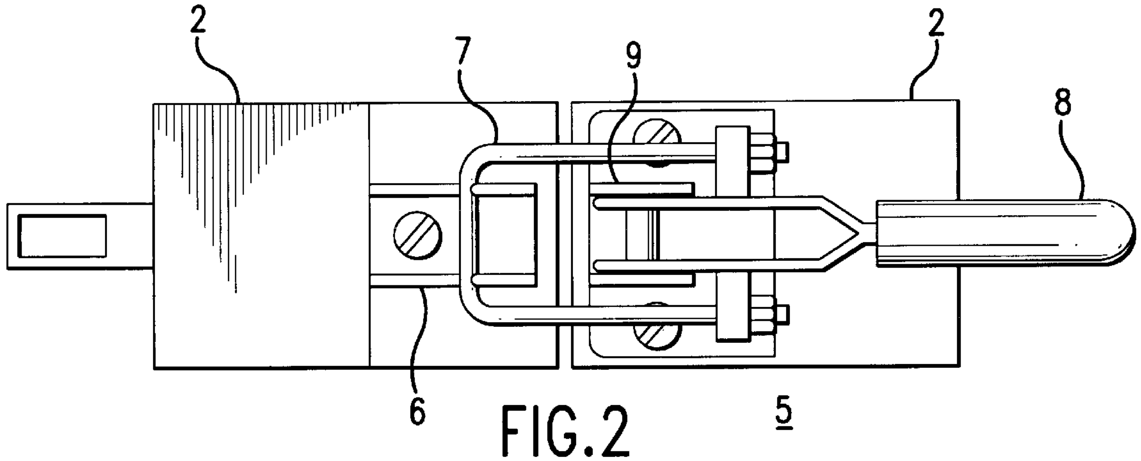
FIG. 2 is a front view of the lifting handle of the present invention.

In FIG. 2 is shown a front view of the clamp 5 of the lifting handle of the present invention. The elements in FIG. 2 are labeled the same as in FIG. 1.

Figure 3:
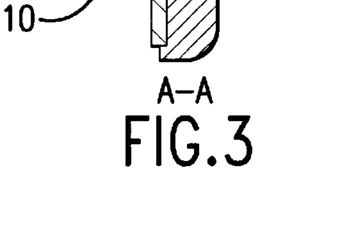
FIG. 3 is a section view cut through the lifting handle of the present invention.

FIG. 3 shows a cross-sectional view through one of grips 2 of the lifting handle of the present invention. A grip surface 10 is shown attached to each of the semi-circular inner surfaces of grips 2 to aid in controlling the plug-in liquid cooled IOT. Grip surfaces 10 are preferably adhesively attached to grips 2, but they may be screwed, riveted, or attached in any suitable way. The grip surface 10 may be a friction or padded material. A friction material may be used, for example, to prevent a plug-in liquid cooled IOT that is being held between grips 2 from rotating or slipping. A padded material may be used, for example, to prevent the surface of the water jacket that is being held between grips 2 from being marred, damaged, or otherwise disfigured. A material that combines friction and padding may be used as well. Grip surface 10 may be made of the same material used to make grips 2.

The invention having been thus described, it will be apparent to those skilled in the art that the same may be varied in many ways without departing from the spirit and scope of the invention. All such modifications are intended to be encompassed by the following claims.

What is claimed is:

1. A lifting handle for manual handling of a plug-in liquid cooled IOT during installation and/or replacement comprising:

a first grip with a semi-circular inner surface;

a second grip with a semi-circular inner surface;

each of said first and second grips having a rear end and a front end and holding a plug-in liquid cooled IOT therebetween for installation and/or replacement in or from a plug-in socket;

a hinge attaching said rear ends of said first and second grips to each other;

a hook depending from said front end of said first grip;

a lever having a distal end and a proximate end;

said proximate end of said lever being pivotally attached to said front end of said second grip;

a loop having a distal end and a proximate end;

said proximate end of said loop being rotatably attached to said lever between said distal end of said lever and said proximate end of said lever;

said distal end of said loop being looped around said hook;

wherein a force applied at said distal end of said lever applies a clamp force through said semi-circular inner surfaces of said first and second grips to said plug-in liquid cooled IOT held therebetween.

2. The lifting handle for a plug-in liquid cooled IOT of claim 1, further comprising:

a friction material attached to said semi-circular inner surfaces of each of said first and second grips.

3. The lifting handle for a plug-in liquid cooled IOT of claim 2, wherein said friction material is adhesively attached to said semi-circular inner surfaces of each of said first and second grips.

4. The lifting handle for a plug-in liquid cooled IOT of claim 1, further comprising:

a padding material attached to said semi-circular inner surfaces of each of said first and second grips.

5. The lifting handle for a plug-in liquid cooled IOT of claim 4, wherein said padding material is adhesively attached to said semi-circular inner surfaces of each of said first and second grips.

6. The lifting handle for a plug-in liquid cooled IOT of claim 1, further comprising:

a first knob attached to said first grip; and a second knob attached to said second grip.

* * * * *